June 5, 1962 H. F. BOK ETAL 3,038,057

EVAPORATION DEVICE

Filed June 11, 1959 7 Sheets-Sheet 1

INVENTORS
HENDRIK F. BOK
EDWARD BOK

BY John Gibson Semmes

ATTORNEY

June 5, 1962 H. F. BOK ETAL 3,038,057

EVAPORATION DEVICE

Filed June 11, 1959 7 Sheets-Sheet 2

INVENTOR

HENDRIK F. BOK
EDWARD BOK

BY John Gibson Semmes

ATTORNEY

EVAPORATION DEVICE

Filed June 11, 1959

7 Sheets-Sheet 3

HENDRIK F. BOK
EDWARD BOK
Inventors

By John Gibson Semmes
Attorney

June 5, 1962 H. F. BOK ETAL 3,038,057

EVAPORATION DEVICE

Filed June 11, 1959 7 Sheets-Sheet 4

Inventors
HENDRIK F. BOK
EDWARD BOK

By John Gibson Semmes

Attorney

EVAPORATION DEVICE

Filed June 11, 1959 7 Sheets-Sheet 5

INVENTOR
HENDRIK F. BOK
EDWARD BOK
BY John Gibson Semmes
ATTORNEY

June 5, 1962 H. F. BOK ET AL 3,038,057

EVAPORATION DEVICE

Filed June 11, 1959 7 Sheets-Sheet 6

Inventors
HENDRIK F. BOK
EDWARD BOK

By John Gibson Semmes

Attorney

June 5, 1962 H. F. BOK ETAL 3,038,057

EVAPORATION DEVICE

Filed June 11, 1959 7 Sheets-Sheet 7

Inventors
HENDRIK F. BOK
EDWARD BOK

By John Gibson Semmes

Attorney 3,038,057

EVAPORATION DEVICE

Hendrik F. Bok and Edward Bok, Amsterdam, Netherlands (both of Lofstrand Camp, Rockville, Md.)

Filed June 11, 1959, Ser. No. 819,640
Claims priority, application Netherlands July 21, 1958
14 Claims. (Cl. 219—38)

This invention relates to an evaporation device wherein a heating element is installed for evaporation of a liquid hydrocarbon and for superheating of the vapor obtained, said vapor serving as a paint spraying medium.

Numerous previous evaporation devices have been developed for evaporation of water and other liquids, principally with regard to the high temperatures required to be developed by the heating elements immersed in said liquid and without attention to controlling electricity supplied to said heating element and thus, controlling the temperature of said heating element, both in terms of liquid level in said evaporation device and the vapor pressure developed therein. The present evaporation device is unique in that it employs a float movable upon the hydrocarbon liquid supplied within said evaporation device and controlling electricity supplied to the heating element resistances in terms of liquid level with said reservoir. The resistances themselves are unique in that they comprise a plurality of concentrically wound tapes of zig zag profile. Thus, a large heated resistance surface with low surface temperature is achievable to avoid cracking with attendant decomposition of the hydrocarbon liquid. According to the present invention a tape having a width of one half inch and a thickness of about .004 inch may be approximately 217 yards in length and afford electric energy of 4,500 watts for conversion into heat. The present invention comprises also a combination bellows and mercury switch which control electricity supplied to the heating element in terms of vapor pressures achieved in the vessel. Furthermore, the present evaporation device is distinguishable from the art in that a superheater is mounted within a vapor chamber portion of the device so as to superheat and control temperatures of the vapor and avoid condensation of the vapor en route from the evaporating device to the point of its utilization in a paint spray gun or the like.

Accordingly, it is an object of invention to provide in an evaporation device float means for controlling electricity supplied to heating element resistances in said device.

Yet another object of invention is to provide in an evaporation device heating element resistances providing increased energy conversion per unit of time.

Another object of invention is to provide in an evaporation device means for controlling electricity supplied to heating element resistances in terms of vapor pressure achieved in said device.

Another object of invention is to provide in an evaporation device superheating means controlling temperature of vapor phase achieved.

Yet additional objects of invention will become apparent from ensuing specification and attached drawings.

In the following drawings there is illustrated a suggested construction.

Figures 3, 4:
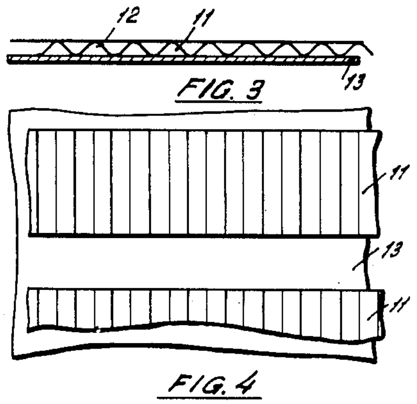
FIG. 3 is a top plan of the superposing of the insulation and resistance tape, according to the instant invention.
FIG. 4 is a side plan and shows fragmentarily the folded construction of a resistance made with the profiled resistance tape according to FIG. 3.
Figure 5:
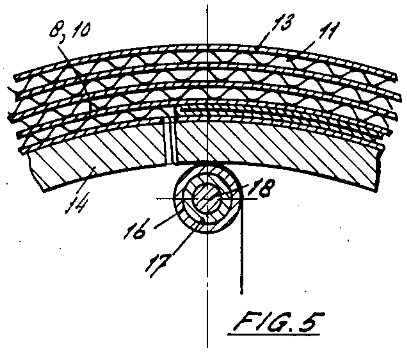

FIG. 5, similar to FIG. 3, shows a superposing of tape and insulation in a resistance pack.

Figure 1:
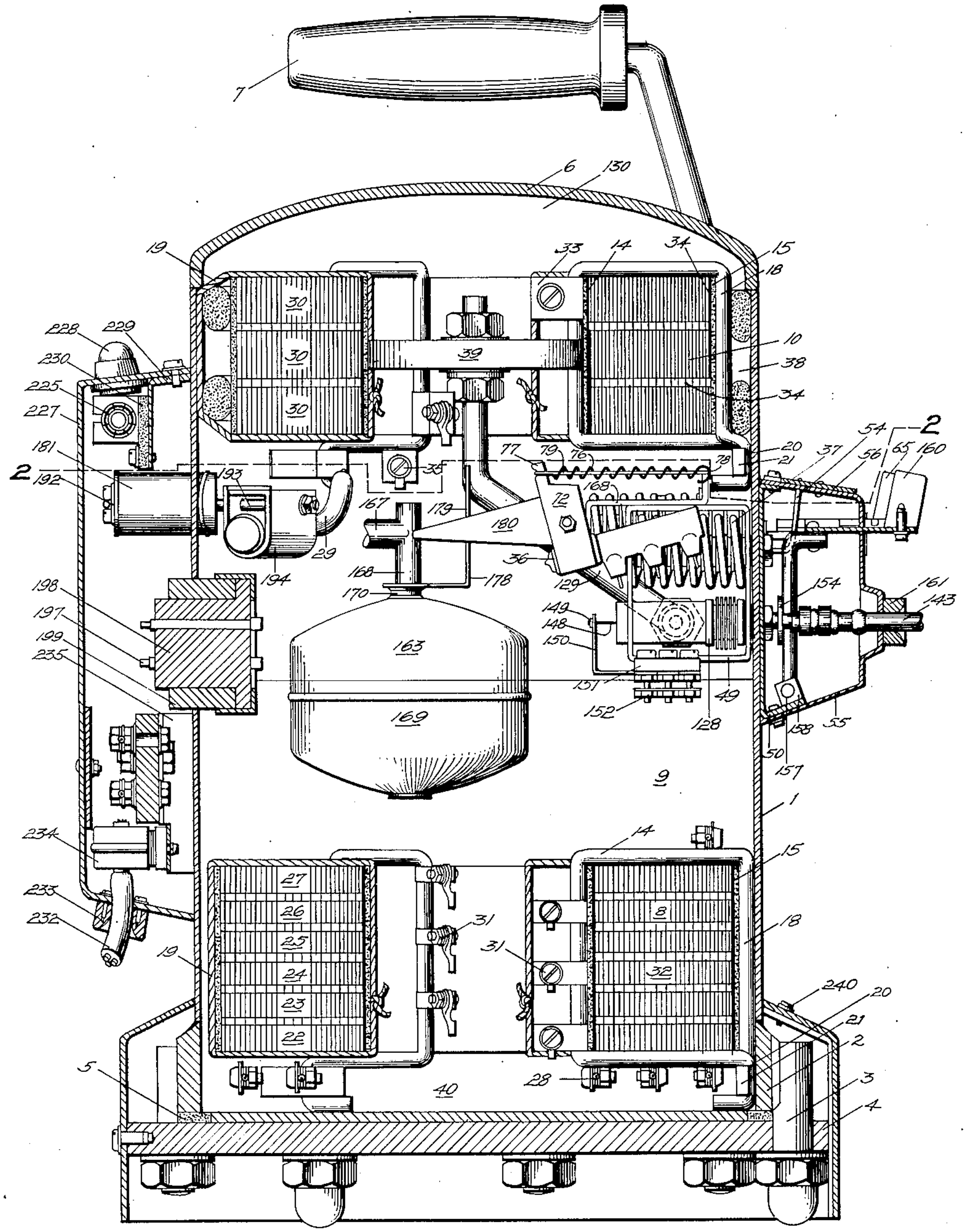
FIG. 1 is a vertical section of an evaporation device constructed according to the instant invention.
Figure 2:
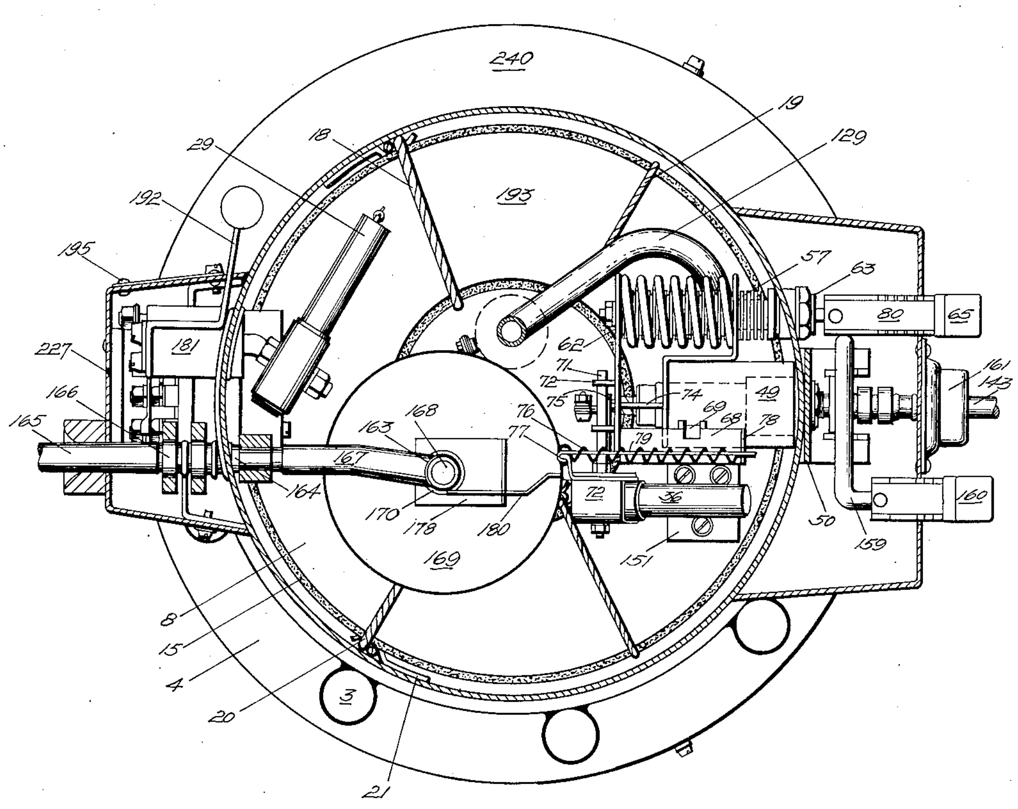
FIG. 2 is a transverse sectional view of the superheater taken along line 2—2 of FIG. 1.
Figures 6, 7:
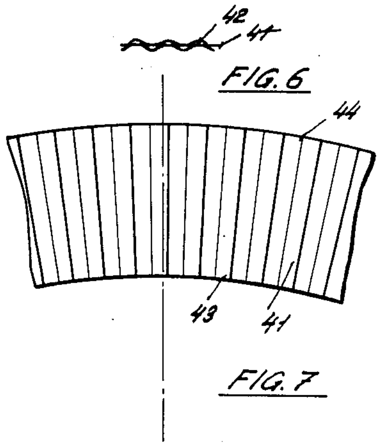

FIGS. 6 and 7 indicate a different profile of the resistance tape applied in the devices according to FIGS. 1 and 2.

Figure 8:
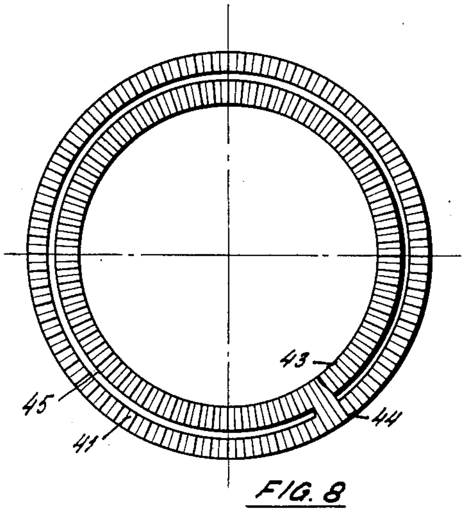

FIG. 8 gives a cross section of a resistance element utilizing the profiled tape according to FIGS. 6 and 7.

Figures 9, 10, 11:
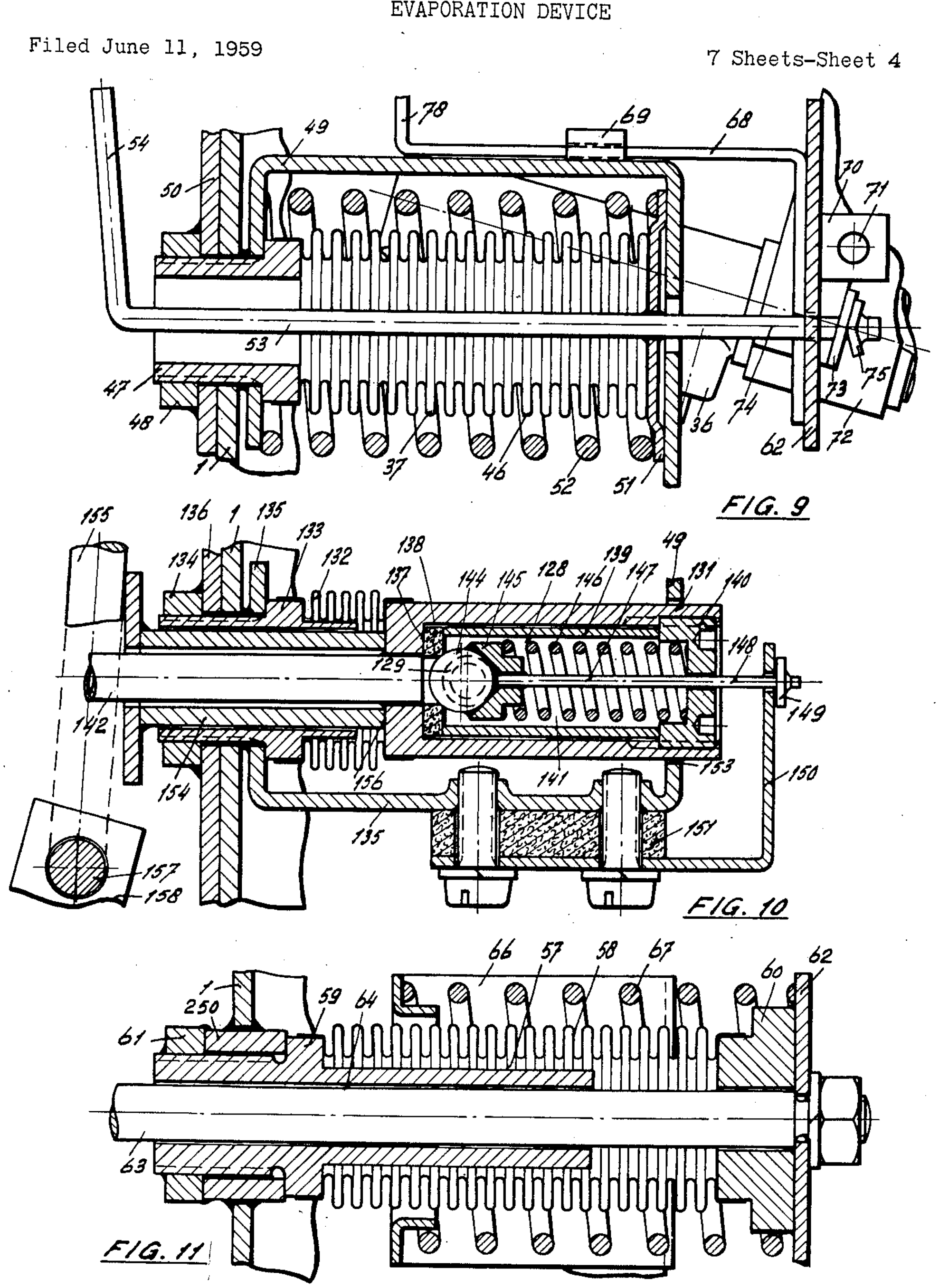

FIG. 9 is the longitudinal section of the pressure controller of the device, according to FIGS. 1 and 2.

FIG. 10 is a longitudinal section of the hose-valve of the device, according to FIGS. 1 and 2.

FIG. 11 is a longitudinal section of the pressure regulator of the device according to FIGS. 1 and 2.

Figures 12, 13, 14:
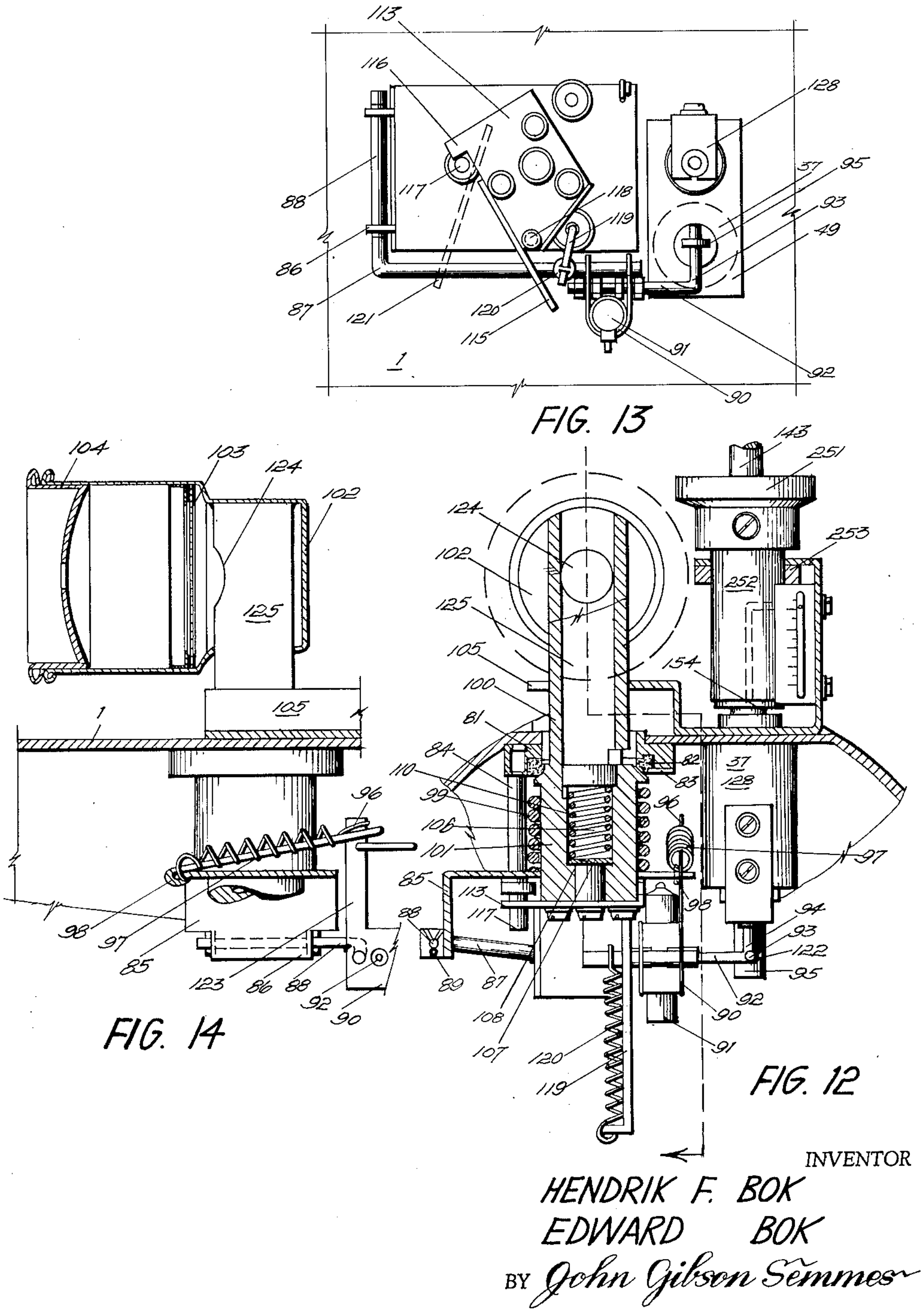

FIG. 12 is a longitudinal section of a filling device, in combination with pressure switch and hose-valve, which modification can be applied in the device according to FIGS. 1 and 2.

FIG. 13 is a front elevation of the unit according to FIG. 12.

FIG. 14 is a fragmentary side elevation of the unit according to FIG. 12.

Figure 15:
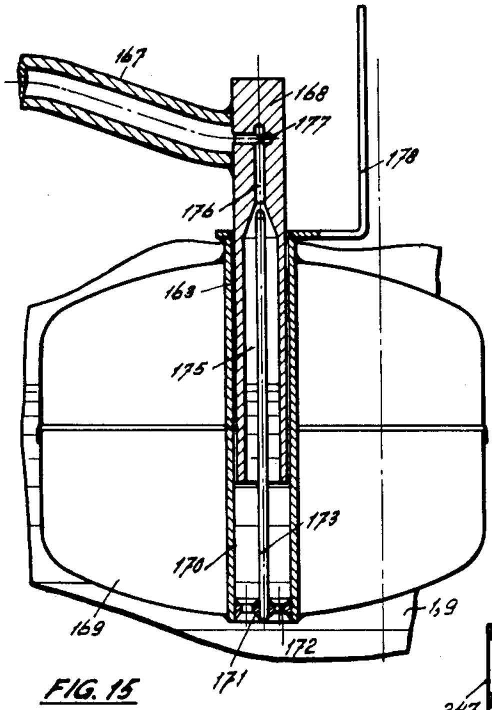

FIG. 15 is a longitudinal section of the float regulator.

Figure 16:
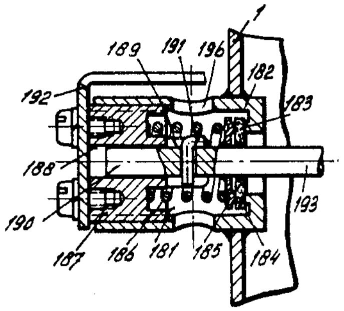

FIG. 16 is a fragmentary longitudinal section of the combination blow-off valve and temperature regulator.

Figures 17, 18:
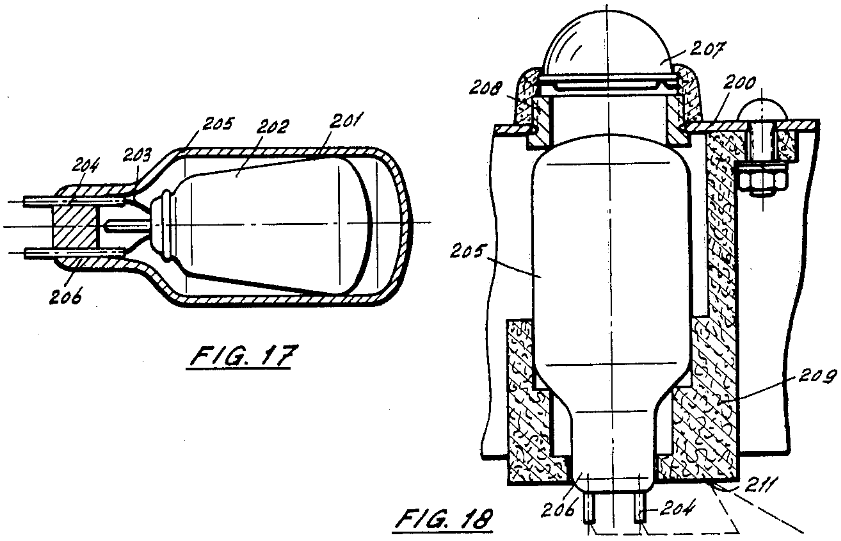

FIG. 17 illustrates an explosion-proof construction of the incandescent lamp.

FIG. 18 is a vertical sectional view of a combination in which the bulb according to FIG. 17 is mounted in the apparatus housing.

Figure 19:
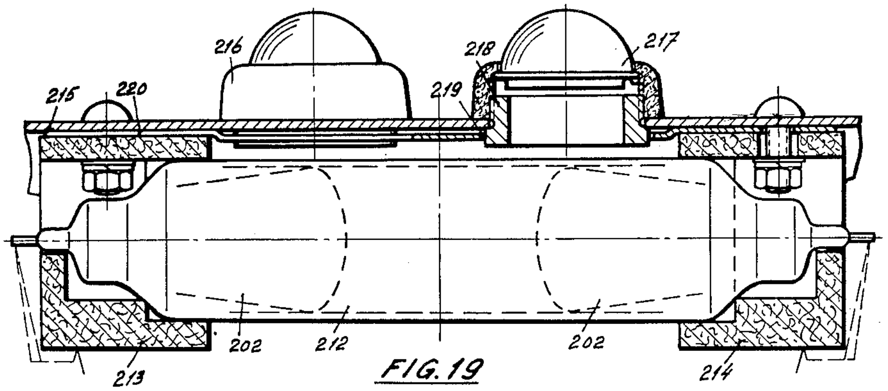

FIG. 19 is a longitudinal section of a combination in which two bulbs according to FIG. 17 are secured.

Figure 20:
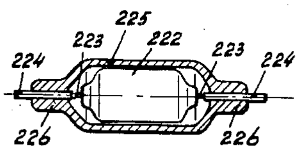

FIG. 20 is a longitudinal section of an explosion-proof construction of a bulb, which is used in the device according to FIGS. 1 and 2.

Figure 21:
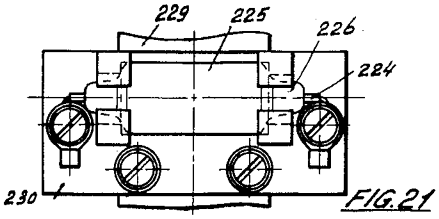

FIG. 21 is a front elevation to the fixing of the bulbs according to FIG. 20.

Figure 22:
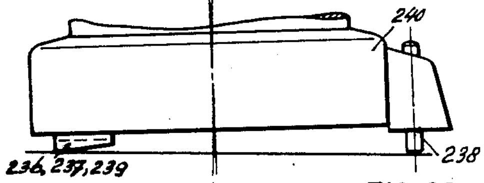
Figure 23:
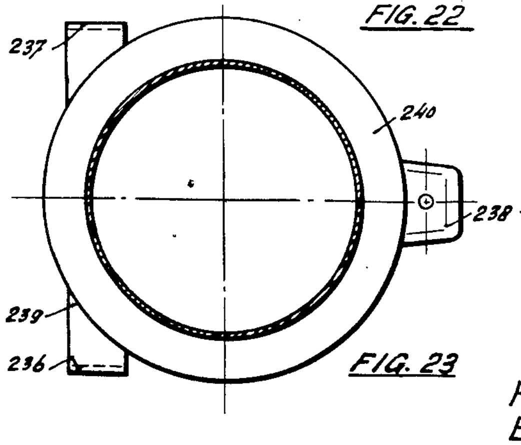

FIGS. 22 and 23 (front elevation and top plan, respectively) show a modified three-point mounting for the device according to FIGS. 1 and 2, with one of the points vertically protruding with respect to the vapor generator base.

Figure 24:
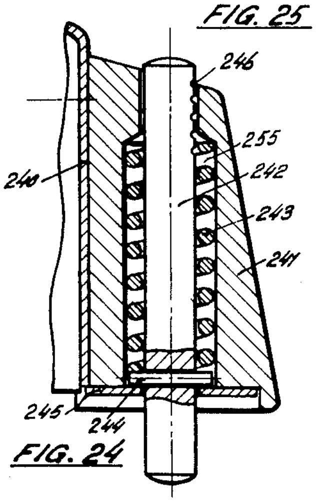

FIG. 24 is a longitudinal section of the spring-loaded supporting point of the three-point mounting to FIG. 23.

Figure 25:
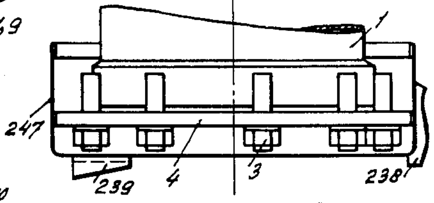

FIG. 25 shows an end elevation (fragmentary) of a cooling jacket, placed around a device according to FIGS. 22 and 23, the base plate of which has been omitted.

In FIGS. 1 and 2 two sections are shown of a device which serves for the evaporation of liquid such as of the hydrocarbon type and the superheating of the vapor-phase obtained, the superheated vapor-phase being used as a spraying medium for paint.

The device is constructed as follows:

Against boiler wall 1 base reinforced by ring 2, boiler bottom 4 is attached with the help of the screw connection 3. Packing ring 5 assures pressure-tightness of this connection. At its other end boiler wall 1 is closed off by means of the welded-on cover 6 to which supporting handle 7 is attached.

In the lower part of the boiler unit heating resistance 8 is suspended for the conversion of electrical energy into heat, which serves for the evaporation of the liquid 9 present in the boiler, and higher up resistance 10 is suspended for superheating of the vapor-phase produced by the resistance 8.

As illustrated in FIGS. 3 through 5, resistance tape 11 is in its lengthwise direction profiled with a succession of similar waves 12 and during manufacture it is rolled up together with insualting tape 13 upon an auxiliary reel (not illustrated). At the inside of the resistance packs 8 and 10 thus formed there is an extra insulating layer 14 and at the outside there is insulating layer 15. Fastening wires 18, insulated with layers of asbestos or glass fiber, are bent around the resistance packs 8 and 10, so that these packs with the help of insulated wires 19 are brought into a constructionally strong unit. The ends 20 of fastening wires 18 are brought together underneath the resistance packs. Fixing of these ends 20 in strips 21 attached to the boiler wall 1 ensures a very strong suspension of the packs 8 and 10 in the boiler.

Resistance pack 8 consists of three resistance elements, divided over the resistance sections 22 to 27 incl. Resistance section 22 at the bottom is provided with connection 28. This resistance section can with the help of a turn of the mercury switch 29 be switched off partially or almost completely in a number of segments, so that the resistance value of the resistance element, which consists of the resistance sections 22 and 23 in combination with the whole resistance piece 30 of resistance pack 10, can be regulated electrically. As a result, a controllable degree of heating is possible for resistance pack 10 which results in a regulable temperature of the vapor-phase flowing through this resistance pack.

The two other resistance elements consist of the sections 24 and 25, 26 and 27 respectively.

The three resistance elements of pack 8 each consist of one long resistance tape, with a fold in its middle, which makes it possible to fix the two tape ends 31 simultaneously to the manufacturing reel and to form two resistance sections, located adjacent the insulating jacket 15 at the outside end of the pack insulating jacket 14 at the inside of the pack.

The same applies to resistance pack 10, which consists of one piece of resistance tape and which over its length is folded in three equal portions, whilst on the manufacturing reel one resistance-end 33 and one resistance-fold have been fixed, owing to which three resistance sections can be wound up simultaneously, whilst at the outside the resistance-end 35 and the fold 34 will be found.

Resistance-ends 31 and 33 respectively of the resistance packs will be spaced at a fixed distance with the help of insulated fixing wires 18. Screw connections attached to these ends make it possible to connect the electrical conduits to these elements.

Mercury switch 36 in combination with pressure controller 37 switches the electric current to the three resistance elements. At a fixed vapor pressure value first the resistance elements 24 and 25 and 26 and 27 are switched off, and then at a somewhat higher pressure electric current is cut off from the combination super-heating element 10 and the resistance sections 22 and 23 (which can be partially switched off).

Between the outer side 15 of resistance pack 10 and the inner side of the boiler wall 1 a protective layer 38 of insulating material is applied. At the same time in the open part of the pack the circular closing disk 39 is placed against the inner side 14, thus forming in the top of the boiler a compartment, accessible to the vapor-phase formed in the lower part of the boiler 50 only through the narrow vertical passages of the profiled tape 11 of resistance pack 10.

A modified construction of the resistance packs is indicated in FIGS. 6, 7 and 8. Here a resistance tape 41 is used, which has in its lengthwise direction a repeated wave profile 42, such that the wave-width on one edge 43 of tape 41 is somewhat smaller than that on the other edge 44. As a result tape 41 assumes a circular shape. Since the repetition of the wave-profile continues over the whole length of the resistance, a closed circular-shaped element is obtained with a diameter for the circle depending on the difference in wave-width of profile 42 as illustrated in FIGS. 7 and 8. With the help of insulating cord 45 the successive resistance layers can be kept at a predetermined distance, and a non-illustrated combination of pressure plates may ensure a constructionally strong unit. When applying such modified waveprofiles, modified packs can be constructed, which packs can be placed concentrically with respect to each other in the boiler construction.

Pressure controller 37 of the apparatus (see the FIGS. 1, 2 and 9) consists of pressure bellows 46, which are attached to the boiler wall 1 with the help of a screw-piece 47 and nut 48, whilst this screw connection at the same time secures interiorly of the wall a stop-plate 49 and bracket 50 exteriorly of the wall. Pressure tightness at the point of passing-through the boiler is obtained by soldering of the coupled components. Against the other side of the bellows pressure-plate 51 is soldered in a pressure-tight way. When the apparatus is not in action pressure-plate 51 is pressed toward stop-plate 49 by compression-spring 52. Through pressure-plate 51 indicating needle 53 is passed and fixed pressure-tight. This needle 53 runs at the one end through screw piece 47 and extends outwardly of the boiler wall. Needle portion 54 is then bent upwardly vertically to effect the possibility of reading the pressure level of the apparatus by combining portion 54 with scale 56 attached to cover 55. Cover 55 is attached to boiler wall 1 with the help of bracket 50 and screw connections.

Adjacent pressure controller 37, pressure regulator 57 (see FIG. 11) is located. Pressure regulator 57 consists of pressure bellows 58 attached at one end to screw-piece 59 and on the other end to closing ring 60. Screw-piece 59 is partially passed through bushing 250 placed in the wall 1, and attached to it with a nut 61. Onto closing ring 60 bearing plate 62 is fastened. A pressure-regulating shaft 63 is screwed against bearing plate 62, to form a pressure-tight connection with closing ring 60 and then is passed through straight lead 64 of screw-piece 59 which extends outwardly of boiler wall 1. At the end of pressure-regulating shaft 63 outside the wall 1 a pressure-adjustment unit 65 is attached longitudinally slidable over the shaft 63. Pressure-adjustment unit through an adjustable linking with the cover 55 can be secured in a definite position with respect to the wall 1. Between a bracket 66 attached to stop-plate 49 and the bearing plate 62 compression-spring 67 is situated, which spring exerts on bearing plate 62 a force directed away from the boiler wall 1. Bearing plate 62 does not move due to bracket 68 and guiding piece 69 of stop-plate 49, so that on bearing plate 62 switch plate 72 can be hingedly fixed with the help of two lips 70 via switch shaft 71. Onto switch plate 72 mercury switch 36 is fastened, and a hinged connection can be made thusly without lip 73 of the switch plate 72 getting stuck to that portion 74 of the indicating needle 53 which is passed through the plate.

As indicated in FIG. 9, on indicating needle portion 74 a stop 75 is placed which can come to rest against lip 73. A tension spring 76 is coupled on the one side with the stud 77 of the switch plate 72 and on the other side with the bent piece 78 of the strap 68. Through tension spring 76 stop-pin 79 runs with stops which may or may not rest against the stud 77 and its bracket 78.

The action of the combination pressure controller, pressure indicator and pressure regulator is as follows:

With the help of the pressure adjustment unit 65 bearing plate 62 can be shifted with respect to the boiler wall 1 and can be secured in a definite position. Mercury switch 36 hingedly attached to switch plate 72 switches electric current for the resistance packs 8 and 10 by means of the switch-in tension spring 76 because there does not yet prevail an excess pressure within the boiler. Thus the pressure-plate 51 of the pressure controller 37 and stop-plate 49 are urged together and thus stop 75 of the pressure controller does not yet press against the lip 73 of switch plate 72. Due to vapor formation with a corresponding rise in pressure in the apparatus, the force against the pressure-plate 51 increases, and it will after the force of the compression-spring 52 of the pressure controller is exceeded, move this pressure-plate in the direction of the boiler wall causing a corresponding indication for the indicating needle 53, which deflection can be read from the scale 56. After running through a fixed distance with pressure plate 51 stop 75 will come to rest against the lip 73 of the switch plate 72. Then, it will carry this lip along and owing to the pivot produced by switch plate 72 and mercury-switch 36 placed thereon will effect against the action of the switch-in tension spring 76 a stepwise switching off of the electric current for the resistances. The pressure will then drop owing to cooling down of the apparatus or consumption of the vapor-phase during operating, and then the force of spring 52 of the pressure controller in combination with the switch-in spring 76 will gradually exceed the opposing boiler pressure. Then, these spring forces will urge press-plate 51 away from the boiler wall 1 with corresponding move of the stop 75 and, consequently, a turn of the mercury switch 36 and switching in of the electric supply for the resistances—stepwise or not. Thereafter the cycle can start anew.

If a different pressure value for the spraying medium is desired, pressure-adjustment unit 65 is set on the new readable position with respect to cover 55. By adjusting the pressure-adjustment unit 65 a shift of bearing plate 62 will take place also with or against the action of the spring 67 of the pressure controller. The shift of the plate 62 has as a result that the switch shaft 71 and thus also the switch plate 72 moves with respect to the boiler wall 1, so that either: the lip 73 can remain linked with the stop 75 of the pressure controller with a lower pressure value as a result since the switch 36 remains switched off longer, or: a higher pressure value will be reached because the stop 75 will become free from lip 73, so that electric supply for the apparatus is switched in by the action of the switch-in spring 76.

Due to the fact that the compression-spring 67 of the pressure regulator 57 for each position of pressure adjustment has a spring pressure slightly higher than the force of the boiler pressure acting on closing ring 60, excessive forces do not bear on bearing plate 62 and, thus, on the combination of stop 75 and lip 73. Stop-pin 79 ensures through its stops with respect to the stud 77 and bracket 78 that the mercury switch cannot turn too far when switching off the electric supply with the help of the bearing plate 62.

A possible addition to the system may consist in a compression-spring which confines stop 75 to a fixed position on indicating needle portion 74 and which spring keeps stop 75 in this position during the normal operation of the apparatus. But with excessive forces on the switching system this spring is pressed in via the combination lip and stop (which may be the case if during the operation of the apparatus the switching of the electric supply is desirable), so that the bearing plate 62 may move away from wall 1 by means of the compression spring 67 with possibly large differential forces between spring 67 and boiler pressure. Owing to the slide-coupling between the regulating shaft 63 and the regulating unit 65 it is impossible to cause a breakdown to the switching mechanism through external forces.

The blocking of the pressure adjustment unit 65 in a fixed position with respect to the cover 55 can be realized because the plate 80 of this unit has a U-profile (see FIG. 2). When depressed U-profile plate 80 runs free in a U-profile shape opening of the cover 55, and can be slid in lengthwise direction with respect to cover 55. Blocking will take place by bringing the unit back into its normal vertical position so that the blocking parts of the cover 55 catch in one of the openings on either side in the plate 80.

A slightly modified arrangement of the combination of pressure indicator, pressure controller, mercury switch and pressure regulator, in which a filling device is used for the periodical supply of liquid to the apparatus and which filling device is at the same time used as a pressure regulator, is indicated in FIGS. 12, 13 and 14.

In the modification and against the boiler wall 1, next to pressure controller 37, a seat-piece 81 is attached pressure-tight. On the inside of the vapor generator a rubber sealing ring 82 is attached to seat-piece 81 with the help of the press-plate 83 and the screw connection of three spacer-pieces 84. By means of spacer-pieces 84 bearing plate 85 is fastened offset with respect to the interior boiler wall 1. Bearing plate 85 is bent at its end, two lips 86 extending from the bent part. Switch shaft 87 is now rotatable in these lips by means of its bent part 88 and is secured by means of cotter pins 89. To switch shaft 87 switch plate 90 is connected by means of hinges, whilst, in this switch plate 90 mercury switch 91 is supported. Through the sides of switch plate 90 and above mercury switch 91 a switch pin 92 is attached to the switch plate, which pin has a bent part 93 fixed in a slit 94 of plate 95. Plate 95 replaces the indicating-needle part 74 of the construction of the pressure controller 37 described above. Here, too, a switch-in tension spring 97 is placed in between the bearing plate 85 and stud 96 of the switch plate 90 also with a stop-pin 98 located within the tension spring.

Against sealing ring 82 sealing cone 100 of the valve closing piece 101 presses with the force of compression spring 99. Valve closing piece 101 is passed through seat-piece 81 outside boiler wall 1 and onto the hollow extension 125 of same a filling funnel 102 is soldered. As indicated in FIG. 14 the filling funnel 102 has sieve unit 103 and cover 104. Valve closing piece 101 has one portion supported in bearing plate 85 and another portion supported outside boiler wall 1 in bracket 105. In valve closing piece 101 the blow-off valve 106 is mounted, in which seal-disk 107 presses against seat 108 with the help of press-disk 109 and compression spring 110. Compressed spring 110 is secured by means of screw piece 111, screwed in valve piece 101. Against the surface 112 of valve piece 101 the stop-plate 113 is screwed, which plate with its stop-part 114 may or may not abut switch shaft 87. With the help of funnel 102 valve piece 101 can be turned and urged away from sealing ring 82. The maximum turning of the valve piece 101 is controlled by stops 115 and 116 of bearing plate 85 in combination with extension 117 of spacer-piece 84. Also the position and degree of turning of valve piece 101 is determined by the identation 118 in the stop-plate 113 and extension 117 of spacer piece 84. On another spacer piece a pin 119 is attached, whilst a pull-spring 120 is coupled on the one side with the switch shaft 87 and on the other side with the bent part of the pin 119, said pin thus being urgeable within indentation 118.

The performance of the modified and combination filling device, pressure controller and mercury switch is as follows:

Valve closing piece 101 presses against the sealing ring 82, whilst the stop portion 114 of stop-plate 113 abuts point 121 of switch shaft 87. Owing to action of tension spring 120, switch shaft 87 is drawn against stop 114, and then in combination with the stop 93 of switch pin 92 against stop-surface 122 of plate 95, mercury switch 91 turns against the action of switch-in spring 97, which results in switching off of the electric supply.

If the apparatus has to be operated with maximum service pressure, funnel 102 is turned until stop-plate 113 has reached the position indicated in FIG. 12. Stop 93 of switch pin 92 will then lie completely free in slit 94 of the pressure controller plate 95, because this plate has not yet been moved. Now the switch-in spring 97 comes into action and switch 91 is turned until stop 123 of the switch-plate 90 comes to rest against bearing plate 85 (see FIG. 14) and the electric supply to the resistance elements is switched in. Vapor generation causes the pressure in the boiler to rise; after some time the vapor pressure will exceed the force of the compression-spring of the pressure controller 37 and the pressure controller plate 95 will move in the direction of the boiler wall 1, until stop-surface 122 of this plate will carry along the stop 93 of switch pin 92 and interruption of the electric supply for the resistance elements takes place due to turning of mercury switch 91. Thus, by turning funnel 102 different pressure values may be set, to which the pressure controller will respond.

Filling of the apparatus is done as follows:

After the pressure in the boiler has dropped to practically atmospheric pressure, it is possible to lift valve piece 101 with the help of funnel 102 and to block the lifted valve piece by the combination of indentation 118 in bearing plate 85 and the extension 117 of spacer piece 84. Then funnel 102 stands vertically. When liquid is poured into funnel 102 it will flow through sieve 103 and opening 124 in hollow extension 125 of the valve piece 101 and via opening 126, into the lower part of extension 125, thence into the boiler. Vapors from the boiler can escape via the opening between sealing cone 100 and sealing ring 82.

In the apparatus according to FIGS. 1 and 2 a hose-valve 128 is included (see FIG. 10). To hose-valve 128 a vapor-outlet tube 129 is coupled with the help of a screw connection and then sealing disk 39 is connected to it with the help of a screw connection. Thus, tube 129 opens into compartment 130 in which the superheated vapors collect that flow through the resistance pack 10, so that a connection—closed off from the rest of the boiler—between compartment 130 and the hose-valve is realized.

The hose-valve is built up as follows:

The valve house 131 is connected with boiler wall 1 through the bellows 132, screw piece 133 and nut 134. Here an extension 135 of stop-plate 49 of the pressure controller 37 and the extension 136 of exterior bracket 50 are clamped in by the screw connection. The whole is soldered pressure tight. Against seat 137 of valve house 131 there lies the sealing ring 138 of Teflon or similar material. This is held in place by pressure wall 139, which with the help of screw piece 140 presses locally against sealing ring 138, which at the same time ensures a pressure-tight fitting of the ring against seat 137. The interior 141 of house 131 connects on the one hand through an opening in pressure wall 139 and tube 129 to compartment 130, on the other hand this interior 141 links up via the outlet tube 142 pressure-tight attached on house 131, with the spray-gun (not indicated in the drawing). Outlet tube 142 bearing outlet-hose 143 is attached with the help of a clamping device.

The connection of vapor compartment 130 with the spray-gun can be closed by ball 144, which with the help of the soldered-on press-piece 145 and valve-spring 146 may or may not press against the edge of the opening in sealing ring 138. Compression-spring 146 is closed in house 131 by means of screw piece 140. To the combination of valve ball 144 and press-piece 145 a shaft 147 is attached, which shaft is passed through the screw piece 140, the end 148 of shaft 147 is slidably locked in the bracket 150 by means of a stop 149 attached to it. Bracket 150 is connected with screws to stop-plate part 135 and these screws simultaneously fasten the insulating terminal block 151 to stop-plate 135. To this terminal block 151 three screw connections 152 have been attached for the electrical connections for the mercury switch. Valve house 131 is guided so that it can slide locally through the opening 153 of stop-plate 49. Within screw piece 133 and slidable lengthwise thereon a pressure unit 154 is placed, which pressure unit 154 of valve shaft 155 can press with its press-surface 156 against valve house 131. Bent portion 157 of valve shaft 155 is rotatable in lips 158 of handling bracket 50. At its other end 159, valve shaft 155 is also bent and with the help of a riveted connection is extended toward adjustment unit 160. Adjustment unit 160 has the same construction as pressure regulating unit 65 described before, which unit is also carried outside and supported in cover 55. Outlet-hose 143 lies free with respect to cover 55 by applying hose supporting piece 161, which makes hose 143 flexible at this spot without damaging it.

The performance of hose-valve 128 is as follows:

In the position "hose-valve closed" pressure unit 154 presses with its press-surface 156 against valve house 131 and this house is displaced over a small distance away from boiler wall 1. Closing ball 144 now presses with the force of spring 146 against sealing ring 138, since stop 149 on shaft 148 becomes free from bracket 150. This ensures a very good seal. Sliding of the pressure unit 154 is possible, since valve shaft 155 can be displaced in the direction of the boiler with the help of adjusting unit 160.

If opening of hose-valve 128 is desired, adjustment unit 160 is moved away from boiler wall 1 and then fastened in cover 55. Through this lateral displacement with a corresponding—though smaller—displacement of part 161 of valve shaft 155, hose valve 128 will become free from pressure unit 154, so that the force of the vapor generator pressure—if present—acting on valve house 131 moves the latter in the direction of the boiler wall 1 automatically. Stop 149 of shaft 147 will come to rest against bracket 150, so that a further move of valve house 131, now against the force of valve-spring 146, will imply a lifting of ball 144 from the sealing ring 138, thus freeing the vapor outlet. If no service pressure prevails in the boiler, hose-valve 128 remains closed owing to the lack of forces which could open it.

In the modification of the unit, illustrated in FIG. 12 hose-tubing piece 251 serves, apart from protecting hose 143, also for the application, as described, of pressure on the pressure unit 154, with the help of hollow screw piece 252 and the nut-screw piece 253 attached to the bent part of bracket 105. Thus, operation of the apparatus hose-valve 128 can be used.

In FIGS. 1 and 2 and 15, the float unit 163 is illustrated. The construction of same is as follows:

In boiler wall 1 a hollow screw piece 164 is mounted pressure-tight and therein outside liquid supply hose 165 is mounted with the help of the clamping devices 166. Inside supply tube 167 is coupled to the screw piece 164 with a screw connection. At the end of inside supply tube 167 lies the valve housing 168. Around valve housing float 169 can move up and down. The straight guiding of this float 169 is effected by the tube 170 of the float in combination with the outer wall of the valve housing 168. In the bottom of the tube 170 a bearing plate 171 is placed with liquid drains 172. Valve pin 173 is fixed on plate 171. Valve pin 173 will move vertically, depending on the level of the liquid 9 in the hollow part 175 of valve housing 168. By partially entering into the channel 176 valve pin 173 can close off liquid supply through tube 167 and channel 177.

During the operating of the apparatus with the issue of vapor-phase through the spray-gun, hydrocarbon liquid is passed from an additional reservoir through a liquid pump (both not illustrated) through channel 176, and then released. The hydrocarbon liquid is passed through float tube 170 and openings 172 in the plate 171 into the boiler. The volume of liquid input is governed by the size of the opening maintained between channel 176 and valve pin 173. If no vapor phase is consumed, liquid level 9 rises so much that a barrier is erected for the liquid with the help of valve pin 173 and channel 170.

To the float 169 bracket 178 is mounted, which bracket can move with its stop-surface 179 the lip 180 of the switch plate 72 in downward direction. If for some reason or other the liquid supply should stop, and nevertheless consumption of vapor-phase should take place, float 169 will drop, and stop-surface 179 will come to rest on the top of lip 180, which will move downward against the action of the switch-in spring 76, and mercury switch 36 will turn, switching off the electric supply to the apparatus.

If owing to a breakdown of the pressure controller and/or mercury switch the service pressure in the vapor generator should rise too high, the pressure safety will come into action, which safety consists in the fact that float 169 deforms, starts leaking and then sinks, and: on the one hand stop-surface 179 turns mercury switch 36 independently from the pressure controller thus switching off the electric supply to the apparatus, and: on the other hand liquid and vapor-phase are forced from the vapor generator through released channel 176 to the liquid pump and the storage reservoir, thus realizing a combination mechanical and electrical pressure safety.

In boiler wall 1 blow-off valve 181 is mounted pressure-tight (see FIG. 16). The valve house 182 has seat 183, against which a sealing ring 184 rests with the help of pressure-plate 185 and compression-spring 186. Compression-spring 186 rests with its other end against screw piece 187, which is screwed in house 182. Screw piece 187 has a central hole 188 and locally two slits 189, through which a switch pin 190 can move lengthwise in the screw piece 187. A guiding pin 191 secures slidably switch pin 190 perpendicular to screw piece 187. To screw piece 187 switch lever 192 is connected with the help of screws. Switch pin 190 is soldered on pressure-plate 185 and passed through sealing ring 184 to the interior of the apparatus. At one end 193 of this pin 190 mercury switch 29 is mounted with the help of the switch plate 194 and a screw connection.

The performance of this combination unit is as follows:

As switch lever 192 is moved transversely—the positions of the lever are then to be read with the aid of scale 195. Also, as screw piece 187 is turned together with mercury switch 29, the mercury column of this switch effects the desired heating and superheating resistance section connections.

If this combination acts as blow-off valve, the boiler pressure lifts sealing ring 184 from seat 183 against the action of spring 186, so that switch pin 190 can slide freely in screw piece 187. Thus vapor escape takes place through the released passage between ring 184 and seat 183 and through openings 196 in valve house 182 to the outside of the apparatus.

For the insulated passing-through of the electrical lead pins through boiler wall 1 to the resistance packs in the boiler a number of pins 197 are used, which pins 197 are screwed in a hard rubber insulating block 198, whilst this block is screwed, pressure-tight, and fastened with cement to the screw tube 199 which is mounted in boiler wall 1.

In the apparatus a lamp combination is mounted for checking functions (see in addition to FIG. 1, FIGS. 17–21 incl.). In FIG. 17 an explosion-proof lamp construction 201 is shown. This construction consists of bulb body 202, in which lead ends 203 (after passing-through pins 204) are soldered. Around the bulb body 202 a glass envelope 205 is secured with at one end the two pins 204 melted in the part 206 of the envelope 205.

FIG. 18 shows the placing of a bulb. On housing 200 of the apparatus a signal glass 207 is screwed with the help of screw piece 208. Further a block 209 of soft-rubber is screwed onto the cover, in which lamp 205 is clamped between screw piece 208 and block 209. Turning is avoided by placing the flat portion 206 of the glass envelope 205 in an opening of block 209, having the same profile as flat portion 206. With the aid of the screw combination 211 (shown in phantom), in block 209 electric wiring of the lamp is facilitated.

In FIG. 19 in one envelope 212 two lamp bodies 202 are located in the way described before. This envelope 212 is clamped on either side into insulating blocks 213 and 214, which are attached to cover 215 of the apparatus. Two signal glasses 216 and 217 are attached also to the cover by the screw pieces 218, the screw pieces being secured by the positioning of flattened portions 219 of screw pieces in a plate 220, the two openings of which have the same profile as that of the screw piece portions 219.

In FIG. 20 a lamp body 222 has a wire 223 at both ends to which wire passing-through pins 224 are soldered. Glass envelope 225 at its segments 226 secures pins 224.

In FIG. 1 the mounting of the lamp unit according to FIG. 20 on the cover 227 is shown, whilst FIG. 21 gives another view of this construction. Here, in FIG. 21 a signal glass is fastened in cover 227. On the bracket 229, which also serves for the fastening of cover 227 on boiler wall 1, a rubber block 230 is screwed, in which block the lamp unit according to FIG. 20 has been clamped before its mounting on the strap 229.

The flexible electrical conduit 232 via a passing-through tube coupling 233 and supporting clamp 234, then is connected terminal block 235, from where the wiring runs to lamp unit 225 and passing-through pins 197.

In the apparatus having a filling device for the periodic supply of liquid, a measuring system according to FIGS. 22, 23 and 24 may be employed. Here the apparatus rests on three points 236, 237 and 238. The points 236 and 237 are the ends of a bent supporting strip 239, which is attached to the bottom of the apparatus, whilst the point 238 consists of a springing unit, springing vertically with respect to the apparatus. This point 238 is attached to decorative base cover 240. It consists of a block 241, having hole 255 in which supporting pin 242 can move. With the aid of compression spring 243 and pin 244, supporting pin 242 is spring-loaded downwardly. Here cover plate 245 secures supporting pin 242 in block 241, whilst at the same time it provides the required straight-guidance for this supporting pin.

When the apparatus rests on the ground and depending on the liquid quantity in the apparatus exerting force on the spring 243, compression spring 243 will be correspondingly pressed. Thus, supporting pin 242 is displaced vertically with respect to the block 241, which displacement corresponds to the quantity of liquid present in the apparatus. Thus a very good reading of the liquid level of the apparatus is possible with the help of the scale 246.

In the FIG. 25 the same apparatus as illustrated in FIGS. 22, 23 and 24 is provided with a cooling jacket 247, which replaces the decorative base cover 240. Here supporting strip 239 and also spring-loaded unit 238 are attached to the base of jacket 247. Cooling jacket 247 at its top portion may be profiled, either locally or not, in such a way that an easy introduction of cooling water in the room between boiler wall and cooling jacket 247 can be effected, whilst after the cooling action, drainage of the water can also easily be accomplished through a drain or otherwise.

It is to be understood that the instant invention is not limited to the construction or details illustrated in the drawings and described herewith and that numerous modifications of invention might be undertaken without departing from the spirit and scope of invention as defined by the subjoined claims.

We claim:

1. A device for the evaporation of liquid comprising a pressure vessel containing said liquid and having a supply conduit for said liquid; a heating element mounted in said vessel for evaporating said liquid; float regulating means mounted in said pressure vessel and contacting said liquid, said float regulating means being operably connected to said supply conduit for regulating liquid level in said pressure vessel; and being responsive to vapor pressure generated in said vessel and returning under emergency conditions liquid and generated vapor to said supply conduit for liquid.

2. A device for the evaporation of liquid comprising a pressure vessel containing said liquid and having a supply conduit for said liquid; a heating element mounted in said vessel for evaporating said liquid; float regulating means mounted in said pressure vessel and contacting said liquid, said float regulating means being operably connected to said supply conduit for regulating liquid level in said pressure vessel; and being responsive to vapor pressure generated in said vessel and returning when not needed liquid and generated vapor to said supply conduit for liquid; and an electrical input regulator operably connected with said float regulating means and for regulating electrical input to said heating element, accordingly as signalled by said float.

3. A device for the evaporation of liquid comprising a pressure vessel containing said liquid and having a supply conduit for said liquid; a heating element mounted in said vessel for evaporating said liquid; float regulating means mounted in said pressure vessel and contacting said liquid, said float regulating means being operably connected to said supply conduit for regulating liquid level in said pressure vessel; and being responsive to vapor pressure generated in said vessel and returning when not needed liquid and generated vapor to said supply conduit for liquid; and an electrical input regulator operably connected with said float regulating means for regulating electrical input to said heating element, accordingly as signalled by said float regulating means; said float regulating means being responsive to generated vapor pressure for shipping said liquid and thus moving downwardly therein, thereby causing release of an outlet opening for said liquid and its vapor phase and switching off of electric supply to said heating element.

4. A device for the evaporation of liquid as in claim 3, said float regulating means being responsive to failure of liquid in said pressure vessel for switching off of electric supply to said heating element and, thus serving as a "dry-boiling safety."

5. A device for the evaporation of liquid as in claim 3, said float regulating means being responsive to failure of liquid in said pressure vessel for switching off of electric supply to said heating element and, thus, serving as a "dry boiling safety," said heating element comprising a series of rolled packs, each pack including a resistance tape having transverse folds and a thin insulating tape wound with said resistance tape, and means switching these said rolled packs in series with an electric supply, said rolled packs being uninterruptedly connected and combinatively wound and measured during manufacture.

6. An evaporation device according to claim 3, said heating element being comprised of a rolled resistance tape which is profiled throughout its length by means of transverse folds, the depth of folds on one side of said tape being maximal and the depth of fold on the other side of the tape being minimal, said difference in depth of folds causing the tape to assume a circular shape throughout its length.

7. A device for the evaporation of liquid as in claim 3, said float regulating means being responsive to failure of liquid in said pressure vessel for switching off electric supply to said heating elements and, thus serving as a "dry-boiling safety," said heating element being comprised of resistance tape profiled in its lengthwise direction by means of transverse fold having a maximal depth on one side of the tape and a minimal depth on the other side of the tape so that the tape assumes a circular shape and an insulating tape wound simultaneously with said resistance tape.

8. An evaporation device as in claim 3, including a water cooling jacket attached exteriorly of said jacket facilitating cooling of said pressure vessel and concomitant lowering of vapor pressure therein.

9. An evaporation device as in claim 3, the exterior base of said vessel being free of electrical wiring and including a raised rim forming a cooling space.

10. A device for the evaporation of liquid as in claim 3, said heating element including a superheating portion for selectively superheating generated vapor.

11. A heating element for use in an evaporation device comprising a vapor generating portion and a superheating portion, each said portion including a resistance tape having transverse folds rolled with an insulating tape into a plurality of packs, said packs being connected in series and the resistance and insulating tapes employed in said superheating portion being of proportionally greater width than the said tapes employed in said vapor generator portion and switch means for supplying electric current individually and combinatively to said packs.

12. A device for the evaporation of liquid comprising a pressure vessel containing said liquid and having a supply conduit for said liquid; a heating element mounted in said vessel for evaporating said liquid; float regulating means mounted in said pressure vessel and contacting said liquid, said float regulating means being operably connected to said supply conduit for regulating liquid level in said pressure vessel and being responsive to vapor pressure generated in said vessel and returning under emergency conditions liquid and generated vapor to said supply conduit for liquid; and pressure control means mounted in said vessel and operably connected to said heating element, said pressure control means being responsive to vapor pressure in said vessel and regulating said heating element accordingly.

13. An evaporation device as in claim 12, said pressure control means comprising a bellows having a mercury switch connected thereto, said bellows turning said switch according to changes in vapor pressure within said pressure vessel and said mercury switch thereby opening and closing electrical contacts of said heating element.

14. An evaporation device as in claim 12, including a blow off valve mounted in said pressure vessel, said valve being actuable to permit blow off of generated vapor upon failure of said pressure control means.

References Cited in the file of this patent

UNITED STATES PATENTS

| | | |
|---|---|---|
| 457,362 | Mitchell | Aug. 11, 1891 |
| 482,074 | Capek | Sept. 6, 1892 |
| 516,167 | Rider et al. | Mar. 6, 1894 |
| 572,449 | Rich | Dec. 1, 1896 |
| 1,046,063 | Felt | Dec. 3, 1912 |
| 1,107,441 | Olson | Aug. 18, 1914 |
| 1,650,632 | Kowallik | Nov. 29, 1927 |
| 2,076,547 | Carlson | Apr. 13, 1937 |
| 2,198,404 | Conill | Apr. 23, 1940 |
| 2,467,393 | Leher | Apr. 19, 1949 |

FOREIGN PATENTS

| | | |
|---|---|---|
| 753,822 | Great Britain | Aug. 1, 1956 |